(12) United States Patent
Malard

(10) Patent No.: US 10,946,343 B2
(45) Date of Patent: Mar. 16, 2021

(54) ACRYLONITRILE-BASED MEMBRANE WITH IMPROVED PERFORMANCE

(71) Applicant: GAMBRO LUNDIA AB, Lund (SE)

(72) Inventor: Benjamin Malard, Villete d'Anthon (FR)

(73) Assignee: GAMBRO LUNDIA AB, Lund (SE)

(*) Notice: Subject to any disclaimer, the term of this patent is extended or adjusted under 35 U.S.C. 154(b) by 231 days.

(21) Appl. No.: 15/747,894

(22) PCT Filed: Jul. 28, 2016

(86) PCT No.: PCT/EP2016/067979
§ 371 (c)(1),
(2) Date: Jan. 26, 2018

(87) PCT Pub. No.: WO2017/017171
PCT Pub. Date: Feb. 2, 2017

(65) Prior Publication Data
US 2018/0221828 A1  Aug. 9, 2018

(30) Foreign Application Priority Data
Jul. 30, 2015 (EP) ..................... 15179071

(51) Int. Cl.
*B01D 67/00* (2006.01)
*B01D 69/08* (2006.01)
*B01D 71/42* (2006.01)
*B01D 71/44* (2006.01)

(52) U.S. Cl.
CPC ...... *B01D 67/0011* (2013.01); *B01D 67/0009* (2013.01); *B01D 67/0027* (2013.01); *B01D 69/08* (2013.01); *B01D 69/087* (2013.01); *B01D 71/42* (2013.01); *B01D 71/44* (2013.01); *B01D 2323/08* (2013.01); *B01D 2323/12* (2013.01);
(Continued)

(58) Field of Classification Search
None
See application file for complete search history.

(56) References Cited

U.S. PATENT DOCUMENTS 3,851,025 A * 11/1974 Ram ...................... B01D 69/08
                                              264/41
4,749,619 A * 6/1988 Angleraud ............ B01D 69/08
                                              210/500.23
5,145,583 A   9/1992 Angeraud et al.
(Continued)

FOREIGN PATENT DOCUMENTS

CA      1340913       4/1989
DE      68913822 T2   12/1989
(Continued)

OTHER PUBLICATIONS

PCT Search Report and Written Opinion prepared for PCT/EP2016/067979, completed Nov. 24, 2016.

*Primary Examiner* — Krishnan S Menon
*Assistant Examiner* — Brad Gordon
(74) *Attorney, Agent, or Firm* — Barnes & Thornburg LLP

(57) ABSTRACT

The present disclosure relates to improved semipermeable membranes based on acrylonitrile copolymers for use in dialyzers for the extracorporeal treatment of blood in conjunction with hemodialysis, hemofiltration or hemodiafiltration. The present disclosure further relates to methods of producing such membranes.

26 Claims, 9 Drawing Sheets

(52) U.S. Cl.
 CPC ...... *B01D 2323/28* (2013.01); *B01D 2325/20* (2013.01)

(56) References Cited

U.S. PATENT DOCUMENTS

| | | | |
|---|---|---|---|
| 5,273,750 A * | 12/1993 | Homiger | A61L 27/16 424/427 |
| 5,626,760 A * | 5/1997 | Pouchoulin | A61M 1/16 210/321.75 |
| 6,017,455 A * | 1/2000 | Shimoda | B01D 67/0011 210/500.23 |
| 6,188,142 B1 | 2/2001 | Loth-Krausser | |
| 6,248,238 B1 * | 6/2001 | Burtin | B01D 63/021 210/500.21 |
| 6,423,232 B1 | 7/2002 | Thomas et al. | |
| 2003/0021826 A1 | 1/2003 | Crost et al. | |
| 2009/0206038 A1 * | 8/2009 | Thomas | A61L 33/06 210/639 |

FOREIGN PATENT DOCUMENTS

| | | | | |
|---|---|---|---|---|
| EP | 0925626 | | 11/2001 | |
| JP | S50107217 A | * | 8/1975 | |
| JP | 62042705 A | * | 2/1987 | ........... B01D 69/084 |
| KR | 10-1072977 | | 11/2011 | |
| WO | WO2007/0148147 | | 12/2007 | |

\* cited by examiner

A

B

ACRYLONITRILE-BASED MEMBRANE WITH IMPROVED PERFORMANCE

CROSS-REFERENCE TO RELATED APPLICATIONS

This application is the U.S. national phase of PCT/EP2016/067979, filed on Jul. 28, 2016, which claims the benefit of European Patent Application Serial Number 15179071.4, filed on Jul. 30, 2015, the entire disclosures of both of which are incorporated herein by reference.

TECHNICAL FIELD

The present disclosure relates to improved semipermeable membranes based on acrylonitrile copolymers for use in dialyzers for the extracorporeal treatment of blood in conjunction with hemodialysis, hemofiltration or hemodiafiltration. The present disclosure further relates to methods of producing such membranes.

DESCRIPTION OF THE RELATED ART

Semipermeable membranes for blood treatment based on acrylonitrile copolymers are known. For example, membranes made from the acrylonitrile-sodium methallylsulfonate copolymer, called AN69, are commercially available. A review of the state of the art for AN69 membranes can be found in Thomas et al., Contrib Nephrol. 2011; 173:119-29. An asymmetric semipermeable membrane comprising a support layer and at least one dense, mesoporous or microporous surface layer defining a separating layer has also been described, for example, in U.S. Pat. No. 5,145,583 A, wherein said membrane contains at least one hydrophobic polymer and at least one water-insoluble copolymer. The copolymer comprises acrylonitrile and at least one sulfonic monomer, wherein the concentration of copolymer in the outer surface of said separating layer is higher than the mean copolymer concentration in the membrane as a whole, and wherein said membrane is water-wettable in the dry state. The fibers are obtained by lowering the temperature of a polymer solution extruded from a die until a homogeneous gel structure is obtained, followed by a washing operation and then a stretching operation. The resulting membrane is, for example, described in Cohen-Addad et al. (2003), Biomaterials 24, 173-179.

The subject matter disclosed in European patent application EP 0 925 626 A1 is aimed at reducing contact phase activation of blood or plasma coming into contact with a negatively charged semi-permeable membrane with an exchanger for the treatment of blood or plasma by extracorporeal circulation comprising a semi-permeable membrane based on polyacrylonitrile carrying bound negative charges. The invention concerned a device for the treatment of blood or plasma by extracorporeal circulation, comprising a semi-permeable membrane based on polyacrylonitrile carrying bound negative charges wherein, before or after formation of the membrane, at least one neutral or cationic polymer is incorporated into the membrane, in a suitable quantity so as to regulate the overall ionic capacity and the electrokinetic index of the membrane, in a suitable manner. The polymer may be cationic and selected from polyamines, preferably from polyetyleneimines.

US 2003/0021826 A1 proposed binding, in a stable manner to the surface of semi-permeable membranes essentially constituted by a copolymer of acrylonitrile and at least one anionic and anionizable monomer, an anticoagulation agent which can exert its anticoagulating activity without being leached out into the blood or plasma during treatment by extracorporeal circulation and to reduce the quantity of anticoagulation agent used systemically in the patient during an extracorporeal blood treatment session. The invention concerned a semi-permeable composite membrane comprising a semi-permeable support membrane and an anticoagulation agent suitable for the treatment of blood or plasma by extracorporeal circulation, said semi-permeable support membrane being essentially constituted by a polyacrylonitrile carrying anionic or anionizable groups; the surface of the semipermeable support membrane intended to be brought into contact with the blood or plasma was coated in succession with a cationic polymer carrying cationic groups which can form an ionic bond with anionic or anionizable groups of polyacrylonitrile, the cationic polymer (for example polyethyleneimine, PEI) comprising chains of a size which is sufficient not to traverse the semi-permeable support membrane, and an anticoagulation agent carrying anionic groups which are capable of forming an ionic bond with cationic groups of said cationic polymer (for example heparin).

WO 2007/148147 A1 describes the use, on a membrane preferably based on a copolymer of acrylonitrile and sodium methallylsulfonate, of a solution of a polymer carrying anionic or anionizable groups in the colloidal form and in an acidic medium, in particular by mixing, for example, a solution of polymer carrying anionic or anionizable groups with a solution of organic polyacid in a specific proportion with respect to said polymer, which results in an increase in both the quantity of polymer grafted to the surface of the membrane and the availability of free cationic or cationizable groups at the surface of this membrane coating. The membrane described thus allows a large quantity of compounds carrying anionic or anionizable groups to be bound. It is suggested for treating septic syndrome, in particular by adsorbing endotoxins contained in the biological fluid, for purifying certain molecules contained in the blood or the plasma by extracorporeal circulation and for reducing systemic anticoagulation in a patient during an extracorporeal blood or plasma treatment. A method for preparing the membrane is also described in WO 2007/148147 A1. Methods for preparing acrylonitrile based membranes are also disclosed in U.S. Pat. No. 5,626,760 A. Methods for producing the hydrogel copolymer comprising acrylonitrile and methallylsulfonate are disclosed, for example, in DE 689 13 822 T2.

The above mentioned known membranes, including certain post-spinning treatments are highly efficient. Still, it is now more and more acknowledged in the scientific community that patients will benefit from dialyzers and membranes which will not only remove the commonly addressed uremic toxins, but also the so-called middle molecules. The expression "middle molecule(s)" as used in the art often refers to molecules consisting mostly of peptides and small proteins with a molecular weight in the range of 500-60,000 Da, and which accumulate in renal failure and contribute to the uremic toxic state. Especially the higher molecular weight compounds of this group are not cleared by low-flux dialysis and can be cleared only to a certain extent by high-flux dialysis. In the kidneys of healthy patients the glomeruli filter molecules of sizes up to approximately 65 kDa. In comparison, current high-flux dialysis membranes have molecular weight cut-offs of not more than about 20 kDa. Many observational studies over the last years have supported the hypothesis that higher molecular weight toxins are responsible for a number of dialysis comorbidities, including, for example, chronic inflammation and related cardiovascular diseases, immune dysfunctions, anemia etc., influencing also the mortality risk of chronic hemodialysis patients. It is therefore desirable to further improve the existing membranes in a way that allows also the increased removal of such molecules by convection and/or adsorption.

SUMMARY

It is an object of the present invention to provide a membrane which is based on a copolymer of acrylonitrile and sodium methallylsulfonate for use as a membrane in the extracorporeal treatment of blood, wherein the membrane has an increased ability to remove higher molecular weight middle molecules from the blood of a patient suffering from renal impairment or renal failure. The membrane is characterized by having a higher water content compared to similar membranes of the prior art. Such increased water content, which preferably is in the range of from 70-73 weight percent under ATPS conditions, is achieved by a new process of preparing the membrane. The new process allows a selective modulation of the water content over a certain desired range by specifically adjusting the spinning parameters. As the said acrylonitrile and sodium methallylsulfonate based membranes have a hydrogel structure, the increased water content presumably leads to an altered structure of the membrane, resulting in a higher permeability of the membrane for higher molecular weight molecules. Said molecules belong to the group of molecules having a molecular weight in the range of between about 15 kDa and about 40 kDa. The new membrane having an increased water content shows increased convective performance, improved toxin adsorption characteristics in terms of improved removal kinetics, and an overall increased adsorption capacity on the membrane surface which, for example, allows enhancing the amount of heparin which can be fixed onto the membrane surface. It is also an object of the present invention to provide for hollow fiber membranes useful for producing a device for the extracorporeal purification of blood.

BRIEF DESCRIPTION OF THE DRAWINGS

FIG. 2A thus illustrates that for a given hydrogel composition (here: 69% $H_2O$, see Example 1) modulation of the membrane water permeability is possible by modifying the stretching ratio.

FIG. 2B shows that higher water content can be achieved by increasing and balancing against each other an increased spinning bath temperature and an increased stretching ratio. The increase in water content is accompanied by an increase in Lp.

FIG. 6A is the electrophoretic pattern of a membrane having a water content of 69 wt.-%. FIG. 6B is the electrophoretic pattern of a membrane having a water content of 75 wt.-%.

DETAILED DESCRIPTION

Membranes based on acrylonitrile copolymers have long since been known in the art and are commercially available still today, for example the membranes often collectively referred to as "AN69" membranes. In the context of the present invention, the term "AN69 membrane" or "AN69 type membrane" refers to membranes based on a copolymer of sodium methallylsulfonate and acrylonitrile. The AN69 membranes are known for their high water content of up to 69%.

One example for a current product comprising a AN69 type membrane is the Evodial dialyzer, which is a hemodialyzer equipped with a heparin-grafted acrylonitrile based membrane such as described in the aforementioned WO 2007/148147 A1 (the so-called HeprAN membrane). The Evodial membrane is characterized also in that the charged surface, originating from anionic sulfonate groups, is neutralized by the polycationic biopolymer polyethylenimine (Thomas et al. (2011), Contrib Nephrol. Basel, Karger, vol 173, 119-129). The surface treatment also allows the almost irreversible fixing of said heparin through very strong ionic binding between the negative charges of heparin and the free positive charges of the cationic polymer. Membranes having the ability to immobilize heparin are highly desirable as it further reduces the need of systemic doses of heparin, and might even allow heparin-free dialysis possible especially for patients with high risk of bleeding (Thomas et al., Contrib Nephrol. 2011; 173:119-29).

AN69 membranes are formed based on a copolymer prepared from sodium methallylsulfonate and acrylonitrile. It is possible to use other co-monomers instead of sodium methalylsulfonate. However, sodium methallylsulfonate is used as a specific, well known example for any such co-monomer throughout the present disclosure without wanting to limit the invention to said methallylsulfonate only. The molar ratio of acrylonitrile and the sodium methallylsulfonate in the AN69 copolymer lies in the range of from 90:10 and 99:1. According to one embodiment of the invention, the molar ratio lies in the range of from 90:10 and 95:5. The AN69 membrane is hydrophilic because the numerous sulfonate groups attract water and create a hydrogel structure which provides high diffusive and hydraulic permeability. In the AN69 membrane the microstructure and the chemical composition offer a context for bulk adsorption of small proteins. The relatively high water content of the hydrogel generally makes the polymer chains easily accessible. The said water content and the related structure of acrylonitrile based hydrogel membranes of the prior art, specifically those based on sodium methallylsulfonate and acrylonitrile, is strongly influenced by the way the membranes are produced.

Figure 1:
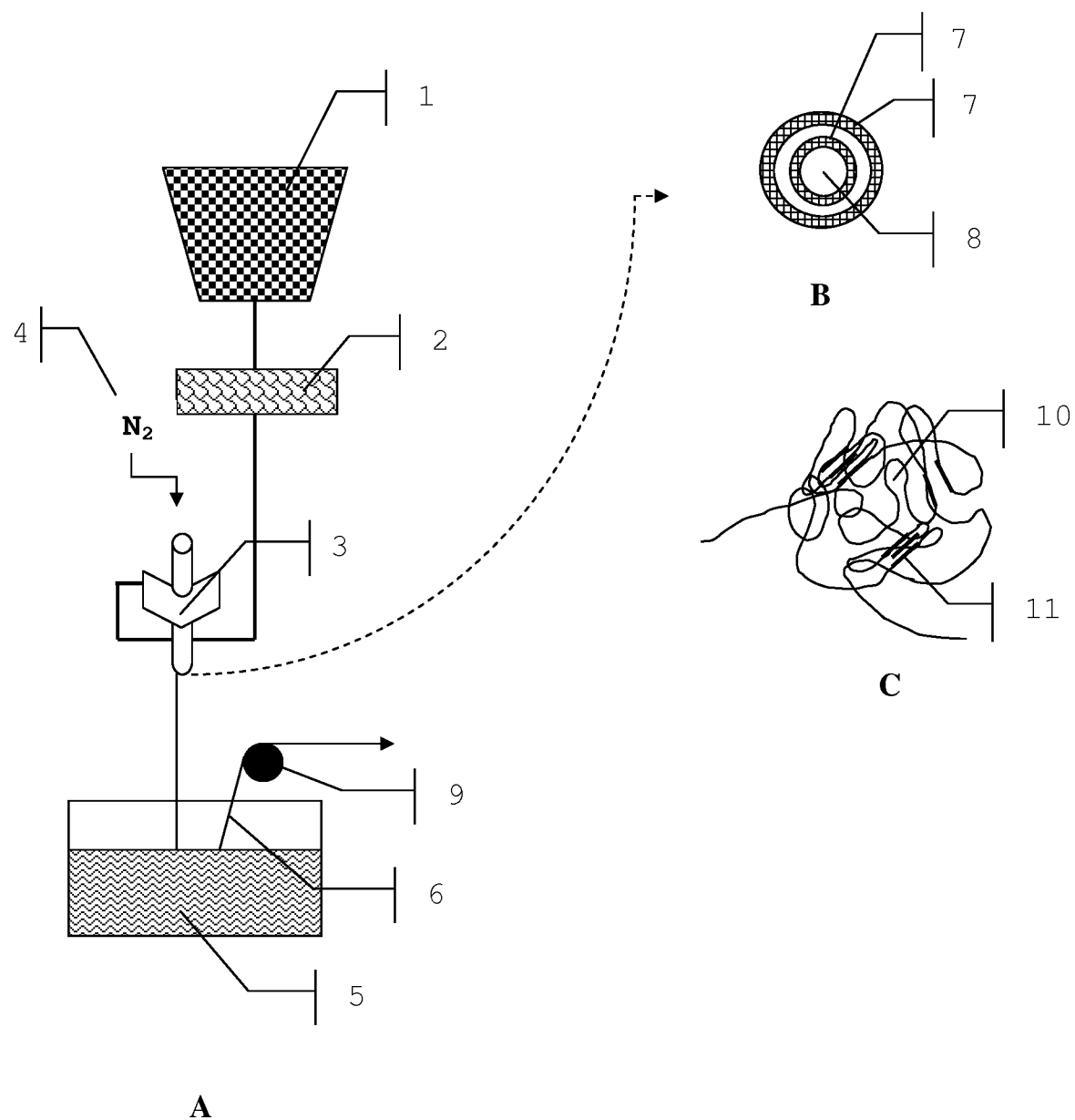
FIG. 1A is a schematic representation of the phase inversion spinning process which is used for preparing membranes according to the invention. The container (1) contains the starting components, such as, for example, DMF, glycerol and acrylonitrile-sodium methallylsulfonate (AN69) copolymer in the form of impregnated granules. The mixture passes a heating extrusion screw (2) and after that enters the spinning head (3).
FIG. 1B depicts a schematic close-up cross-section view of the spinning nozzle (3). Two concentric rings (7) enclose the polymer solution. Nitrogen (4) forms the center medium or core fluid which is blown into the center (8) of the spinning nozzle. A "preformed" hollow fiber leaves the nozzle and enters the spinning bath (5) which comprises water at an elevated temperature (see also FIG. 3). The fiber (6) is taken up by rollers (9) at a speed which is slightly higher than the speed with which the fiber leaves the nozzle. The fiber is thus stretched in the hot water bath, leading to a partial transformation of amorphous zones (10) in the membrane to so-called "pseudo crystalline" zones (11). This transformation is schematically depicted in FIG. 1C. The final stretching in the hot water bath is an essential step of the method as disclosed in this application and determines, among other parameters, the final hollow fiber dimension and performance.

The AN69 membranes are generally produced by a phase inversion process making use of a hydrogel which is derived from a copolymer of acrylonitrile and sodium methallylsulfonate. The manufacturing process for AN69 hollow fiber membranes is based on high temperature spinning and the use of nitrogen as center medium when hollow fibers are produced (FIG. 1). Hollow fibers are obtained by preparing a composition of acrylonitrile and sodium methallylsulfonate, N,N-dimethyl formamide (DMF) and glycerol and heating it to a temperature of between 110° C. and 150° C. before the composition enters the spinning nozzle, for example by means of an heating extrusion screw. According to one embodiment of the invention, the temperature is in the range of from 130° C. and 145° C. For the membranes used in the Examples, a temperature of 140° C. was chosen. The amount of the copolymer is generally adjusted to 34 to 36 wt.-%. For the membranes used in the Examples the amount of copolymer was chosen to be 35 wt.-%. DMF or any other solvent which can be used, such as, for example, dimethylsulfoxide (DMSO) or N-methyl-pyrrolidone (NMP), is present in the composition in an amount of from about 50 to 58 wt.-%, and glycerol is present in an amount of from 6 to 16 weight-%. Of course, all components of the composition will add up to a total of 100%. According to one embodiment of the present invention, the copolymer is present in the composition in an amount of 35 wt.-%, DMF is present in the composition in an amount of 52 wt.-%, and glycerol is present in an amount of 13 wt.-%. It should be noted, however, that the initial composition is not decisive for arriving at membrane of the present invention and may therefore vary within the given ranges or even beyond. The increased ability of the membranes of the invention to remove higher molecular weight middle molecules from the blood of a patient suffering from renal impairment or renal failure is not correlated to a defined composition of the membrane, but to the way it is prepared with regard to spinning bath temperature, optionally in combination with the stretching ratio. Therefore, the membranes prepared for illustrating the invention in the Examples have the same initial composition of copolymer, DMF and glycerol. It should therefore be appreciated that the composition of the membranes of the Examples should not be interpreted as wanting to reduce the invention to membranes of this composition only. The composition is then passed through a spinneret. The extrusion is carried out in the presence of the aforementioned inert nitrogen as center medium. The fiber then enters a spinning bath (see FIG. 1A).

The spinning bath is set up in a certain distance to where the fiber leaves the spinneret. The distance usually is in the range of from 0.8 to 1.9 m. The gap between nozzle and spinning bath contains ambient air at ambient temperature. Usually, the gap is located in a sealed cabin to prevent vapors from spreading. In the prior art, the spinning bath is adjusted to temperatures of from −4° C. to 20° C. Typical spinning bath temperatures for known AN69 membranes are in the range of from 6° C. to 20° C. For example, a standard spinning bath temperature for AN69 membranes is 10±2° C. (see Example 1). According to the present invention, the temperature of the spinning bath has to be raised to between 25° C. and 50° C. in order to arrive at membranes having a higher water content. According to one embodiment of the invention, the spinning bath temperature is in the range of from 30° C. to 45° C. According to yet another embodiment of the invention, the spinning bath temperature is in the range of from 40° C. to 45° C. The initial spinning bath usually consists of water. Optionally, additives such as $H_2O_2$ can be added in order to prevent bacterial growth. However, it is possible to add an organic solvent to the spinning bath. The solvents can be chosen from the same solvents which are used for forming the initial polymer composition.

Figure 2:
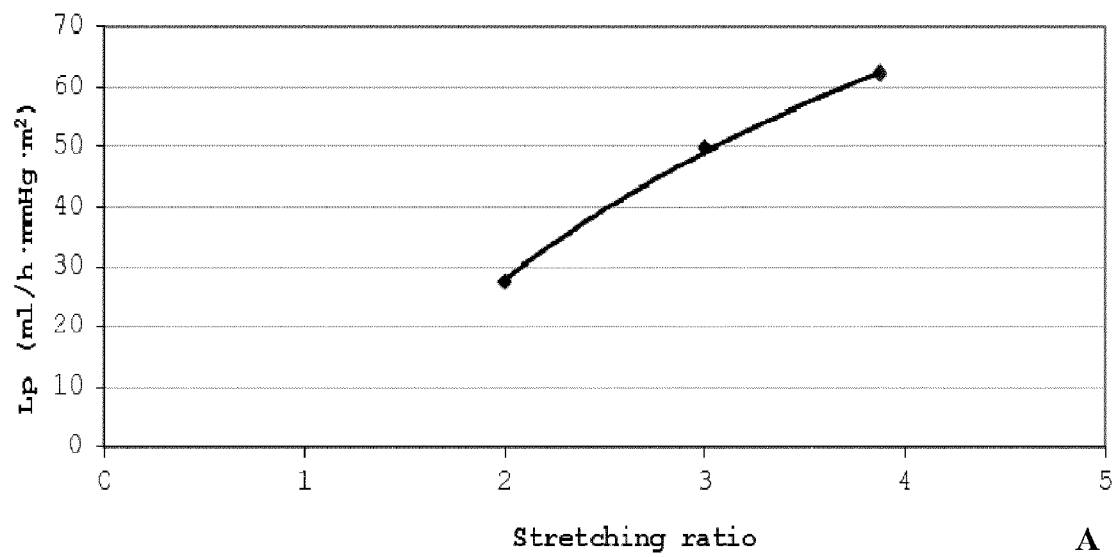
FIG. 2A shows the relation of liquid permeability and stretching ratio in terms of Lp increase. The expression "stretching ratio", as used herein, refers to the ratio between the speed of winding-up the hollow fiber membrane and the linear extrusion velocity when the polymer solution is extruded from the slit nozzle of the tube-in-orifice type double spinning nozzle, and is a value obtained by dividing the winding-up speed by the linear velocity of extrusion of the polymer solution. The "stretching ratio" is sometimes also referred to as "draft ratio". It is known also from other materials, such as PTFE, that the stretching ratio has an influence on the permeability of a membrane (Xi et al. (2008), Polymers for advanced Technologies 19:1616-622).
FIG. 2B depicts the interdependency between liquid permeability, spinning bath temperature and water content. Hollow fibers were obtained using a gelification process that consist of processing a collodion composed of acrylonitrile and sodium methallylsulfonate (35 wt.-%), DMF (52 wt.-%) and glycerol (13 wt.-%) through a spinning nozzle heated to about 140° C. The fiber lumen is obtained using an inert gas (nitrogen). Stretching ratios applied were 2, see data point (A), and 4, see data point (B), both at a fixed spinning bath temperature of 10° C. Data points (C) and (D) have been obtained with the same stretching ratio as data point (B). However, the spinning bath temperature was increased to 30° C. (C) and 40° C. (D), respectively. Data point (E) was obtained at a further increased spinning bath temperature of 45° C. and a further increased stretching ratio of 4.4, leading to a further increase in liquid permeability. Liquid permeability measurements were performed in accordance with Example 2.
Figure 2:
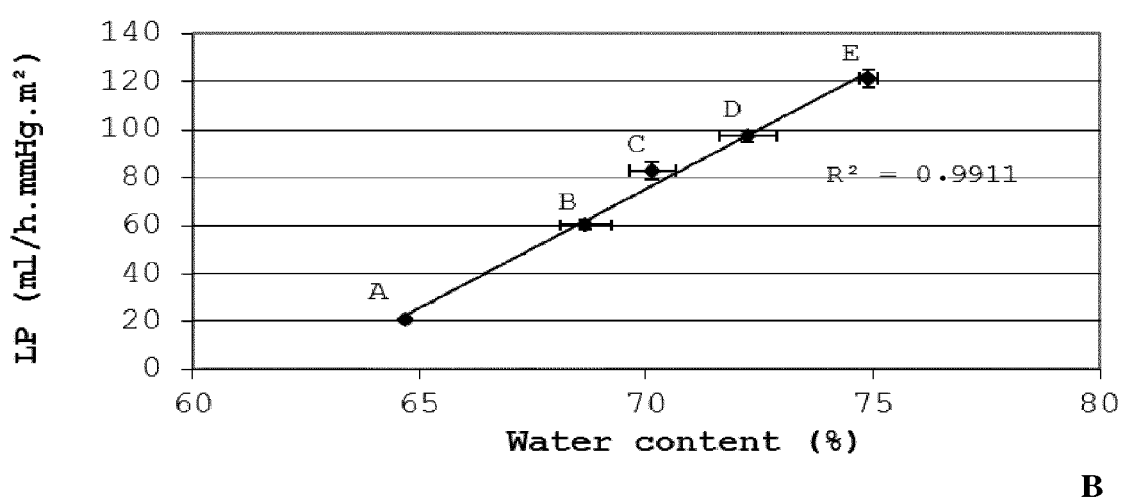

Following the submersion into the spinning bath, the fiber can subsequently be subjected to an operation of stretching at a temperature of about 90° C. to 100° C., generally at about 95° C. The stretching operation is done while the fiber is still immersed in water, and the desired temperature can be achieved by heating the water accordingly. The stretching can be achieved by adjusting the speed of the uptake rollers (FIG. 1A) onto which the fibers are transferred from the spinning bath. It is known that the stretching ratio is impacting the formation and ratio of certain amorphous membrane zones and pseudo-crystalline zones of certain membrane types (Xi et al.: Polymers for advanced Technologies 19(2008)1616-1622). Stretching ads to the alignment of amorphous zones which in turn increases the structural integrity of the resulting membrane (FIG. 1C). An increased stretching ratio may further increase the Lp of the membrane to a certain extent (FIG. 2). The stretching ratio is defined by the take-up speed of the second roller which is higher compared to the take-up speed of the first roller. According to the present invention, the ratio preferably is in a range of from 3.6 to 4.5. According to a specific embodiment of the invention the stretching ratio is in a range of from 3.6 to 4.1. Stretching ratios of 5 or higher are undesirable because they may result in damaged or torn fibers. High stretching ratios may also result in a phenomenon referred to as "crystallization under constraint", which refers to an extended reorganization of the amorphous zone, leading to a behavior which is typical rather for impermeable crystalline zones.

Figure 3:
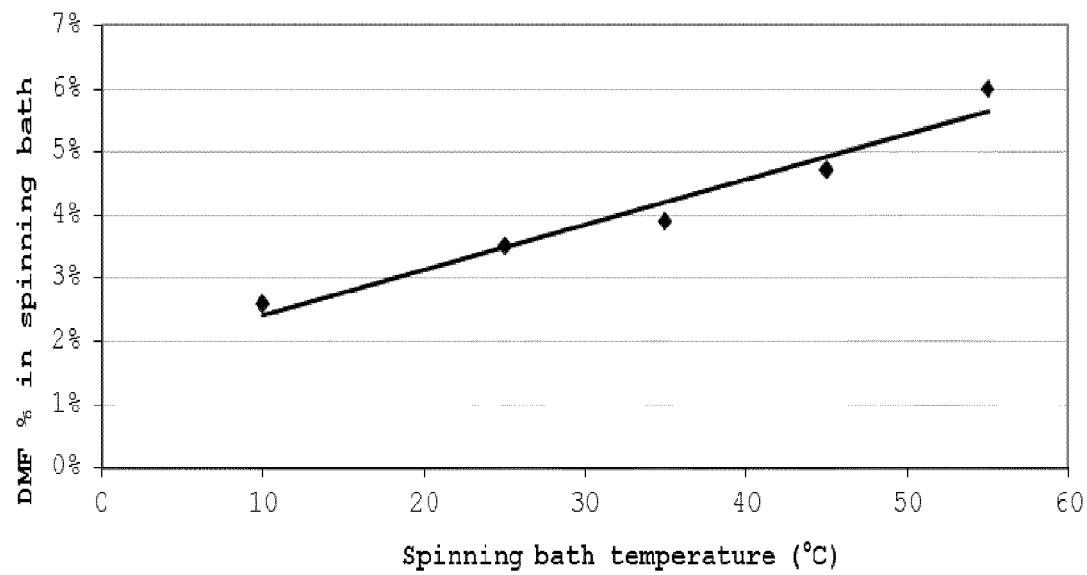
FIG. 3A shows the concentration of the amount of solvent DMF as determined by gas chromatography, in percent by weight, which is found in the spinning bath in relation to the spinning bath temperature. It was found in the present invention that the spinning bath temperature influences the gelification during spinning. As a consequence of the temperature increase, it is assumed that the transfer kinetic between the membrane solvent and the spinning bath water is faster, finally resulting in a higher DMF content of the spinning bath and, vice versa, a higher structural water content in the membrane.
FIG. 3B depicts the combined effect of the stretching ratio and the spinning bath temperature on the liquid permeability of a membrane. The hollow fiber membranes were prepared as described in Example 1, wherein the spinning bath temperatures were chosen to be 10° C. as described there and 40° C. Data points for the Lp depicted with -▲- have been obtained with a stretching ratio of 4. Data points for the Lp depicted with -■- have been obtained with a stretching ratio of 5 at a spinning bath temperature of 45° C. Lp was determined as described in Example 2. It was found in the present invention that a defined combination of higher spinning bath temperature and a certain stretching ratio will result in higher Lp values.
Figure 3:
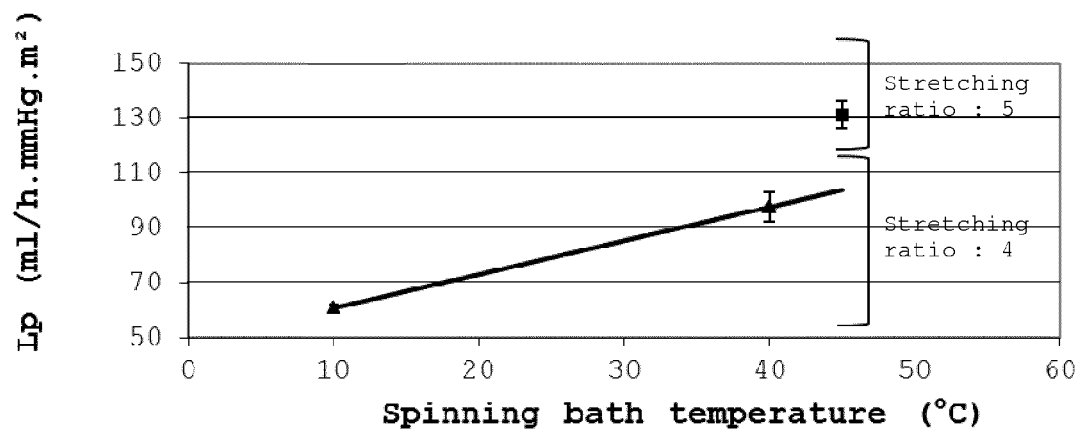
Figure 4:
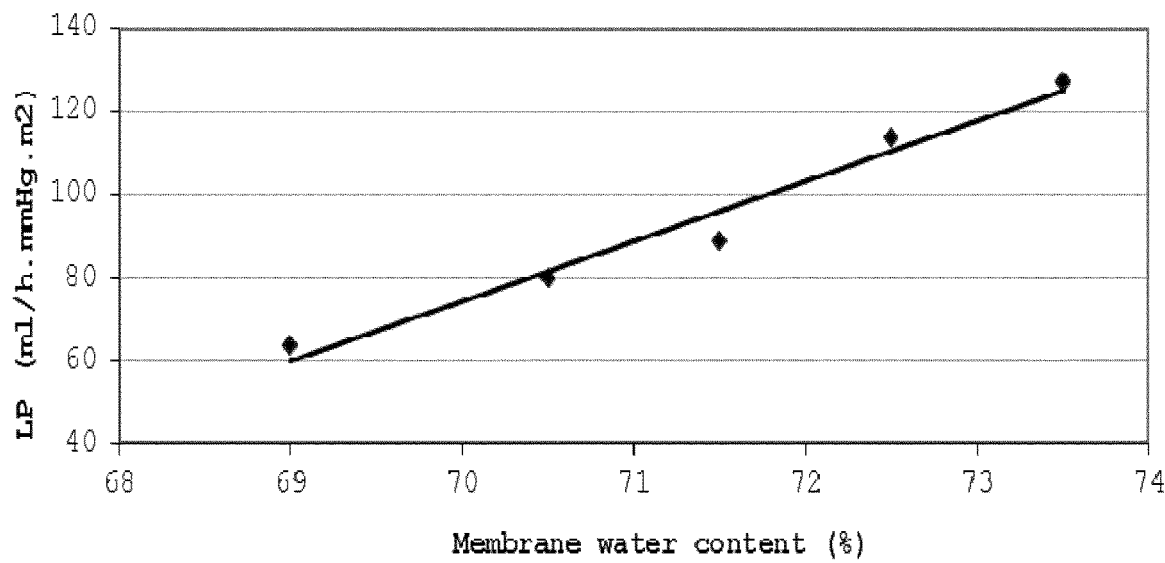
FIG. 4 shows the relation between membrane water content (wt.-%) and the permeability of the membrane according to the invention in terms of Lp. A membrane water content of 69 wt.-% is long since known from prior art membranes. It was found that with increasing water content a significant increase in the liquid permeability of the membrane (Lp) can be achieved which is connected to improved removal capacities of a acrylonitrile and sodium methallylsulfonate based membrane (see also FIG. 5).
Figure 5:
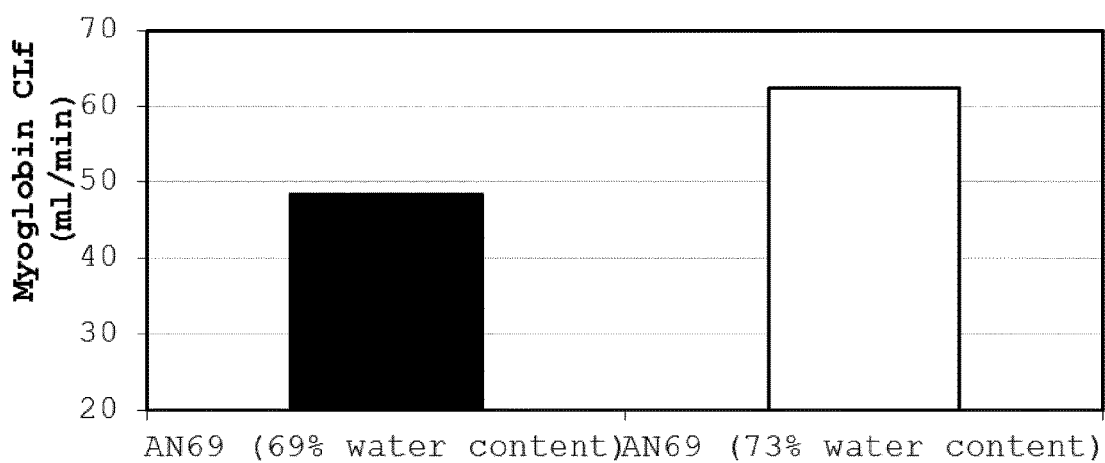
FIG. 5 refers to a comparison of the ability of membranes with differing water content to remove myoglobin from human plasma in a closed loop circuit with $Q_B$=300 ml/min, UF=60 ml/min. The membrane according to the invention having a water content of 73 wt.-% shows a better clearance of myoglobin than the prior art membrane.
Figure 6:
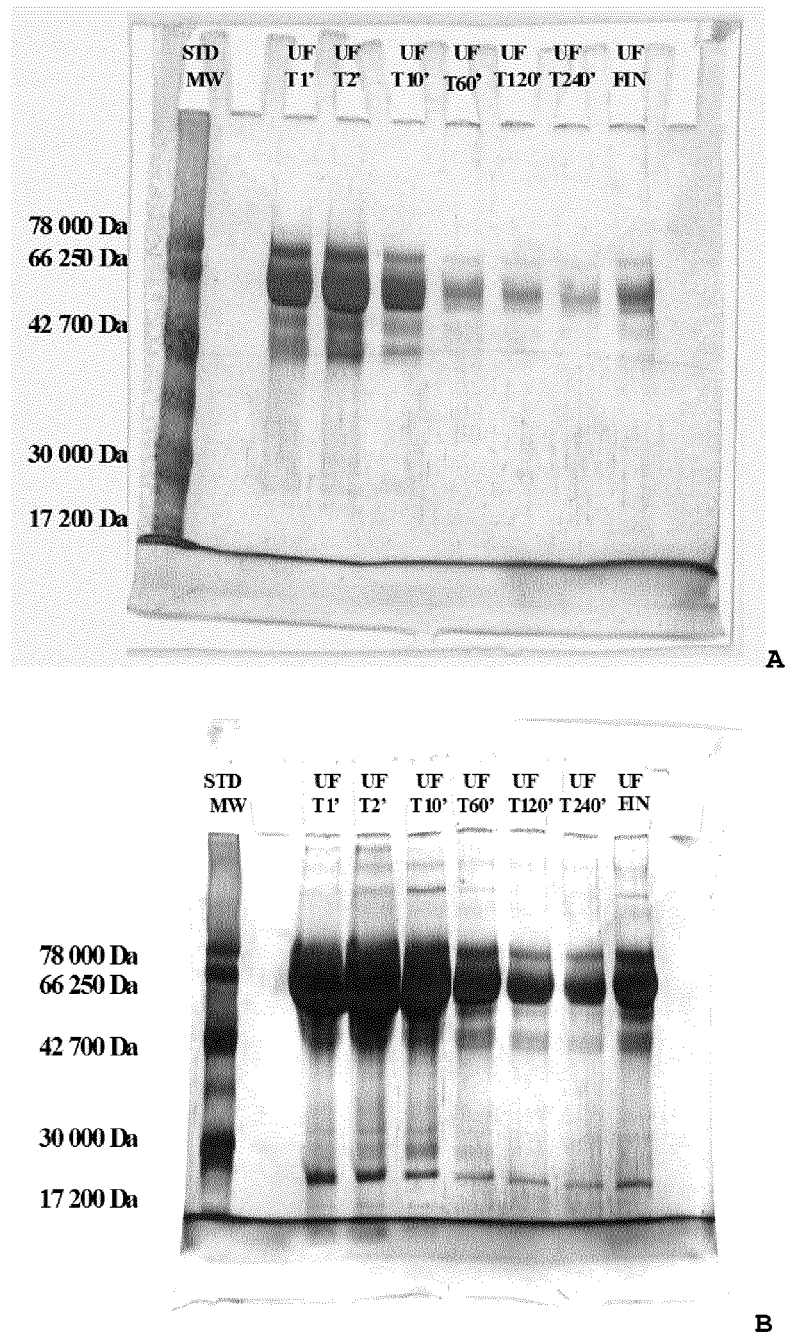
FIG. 6 shows the respective electrophoretic pattern of the ultrafiltrate over 240 minutes of circulation (see also FIG. 4) with human plasma and $Q_B$=300 ml/min, UF=60 ml/min.
Figure 7:
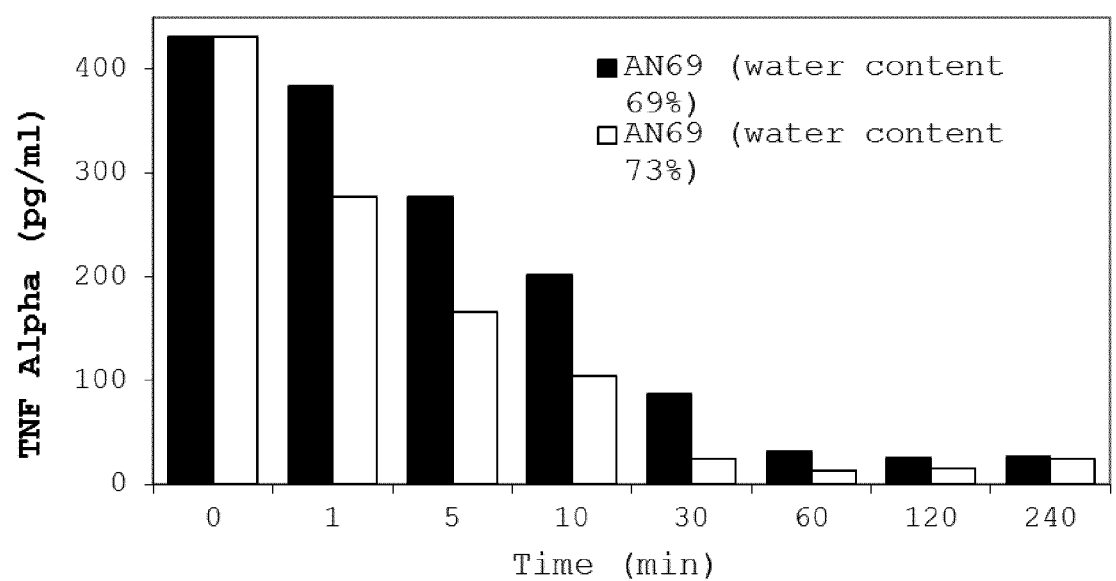
FIG. 7 shows the reduction of TNF-alpha in human plasma in a closed loop circuit with $Q_B$=300 ml/min, UF=60 ml/min as described also in FIG. 5. The molecular weight of TNF-alpha is about 51 kDa. The membrane having a water content of 73 wt.-% removes the TNF-alpha more quickly over time than the membrane having a water content of 69 wt.-%.

It was found in the present invention, that an increase of the spinning bath temperature to the above mentioned ranges, optionally in combination with a specific stretching ratio, has a surprising impact on the characteristics of the membrane. An increase of the spinning bath temperature as such is believed to enhance the transfer kinetics between the membrane solvent DMF and the spinning bath water which in turn further increases the water content of the membrane, surprisingly without destabilizing it (FIGS. 3A and 3B). By increasing the spinning bath temperature to temperatures as mentioned before (FIG. 3A) it is possible to increase the water content under ATPS conditions of the resulting membrane to from 70 to 75 wt.-%, thus increasing the Lp and improving the overall membrane performance (FIG. 4). According to one aspect of the present invention, the water content under ATPS conditions is raised to 70-73 wt.-%. While it is possible to arrive at membranes having a water content under ATPS conditions of from 70 to 75 wt.-% by increasing the spinning bath temperature to the beforementioned range, it may prove beneficial to additionally submit the fiber to a stretching operation. Beyond a certain temperature of the spinning bath (roughly temperatures above 40-45° C.), a phenomenon tends to impact the fiber geometry which can be described as "fiber roundness". The phenomenon is undesirable because a homogenous geometry facilitates the further processing of the membrane. Also, as a consequence, hemocompatibility might be affected. Therefore, especially at higher spinning bath temperature of above 40 to 45° C., it is a good compromise to adjust the desired Lp both by a combination of increased spinning bath temperature and stretching ratio within the ranges as shown above. As the ranges given are relatively narrow, it is possible for a person skilled in the art to generate membranes according to the invention with varying characteristics, e.g. different Lp values and water contents within the claimed range such as shown in FIG. 2B.

In the present disclosure, the values recited for water content of membranes refer to the equilibrium water content of the respective membrane under ATPS conditions, i.e., at ambient temperature and ambient pressure, and in air saturated with water vapor.

As can be seen from FIG. 2B, low spinning bath temperatures of about 10° C. will result in membranes having a water content under ATPS conditions, of 69 wt.-% or below (see data points A and B), even if combined with a relative high stretching ratio of 4 (data point B). Stretching to some limited extent increases the Lp and water content (data point B of FIG. 2B). However, it is the increase in spinning bath temperatures (FIG. 2B, data points C, D, E) which allows the formation of stable membranes having a water content under ATPS conditions, of 70 wt.-% and more. Stretching further impacts the Lp and stabilizes the membrane geometry when the spinning bath temperature reaches about 45° C. or more, thus contributing to arriving at optimized membranes. It should be noted, however, that higher water contents could in principle be achieved by only increasing the spinning bath temperature.

The membranes of the present invention, having a water content under ATPS conditions in the range of from 70 wt.-% to 75 wt.-%, are characterized by an improved convection for middle molecules. They are also characterized by a higher adsorption capacity for at least one substance chosen from TNF-alpha, myoglobin, factor D or interleukin 6 (IL-6).

It is another object of the present invention to provide for membranes according to the invention having a hydraulic permeability Lp (saline solution, 0.9 g/L) in the range of between 60 and 130 ml/h·mmHg·m². According to one embodiment of the invention, the hydraulic permeability of the membranes is in the range of between 60 and 100 ml/h·mmHg·m².

The expression "Lp" or "hydraulic permeability" as used herein refers to the permeability of the membrane to water or an aqueous solution (saline solution), hereinafter referred to as "liquid". Hydraulic permeability expresses how readily the liquid can move across a membrane and has units of volume of liquid per unit area of membrane per unit time per unit driving force. The membrane characteristic having the largest impact on hydraulic permeability is pore size. The Lp is thus also a good parameter for describing a membranes structure. In the present case, the increase in hydraulic permeability shows that the convective capabilities of the membrane according to the invention can be improved.

It is known that the AN69 type membranes, with and without being modified with a polycationic polymer such as PEI on their surface and optionally also with an anticoagulant, have a remarkable ability to immobilize certain uremic toxins, including larger middle molecules, to their surface by adsorption. It was found that by modifying the water content and Lp of the membranes compared to the prior art membranes (e.g. membranes with 69 wt.-% water, such as Evodial), also the adsorptive capacities can be improved. It is hypothesized that due to the modification as suggested herein, the accessibility of the membrane surface for adsorption is increased. It is thus another object of the present invention to provide for a membrane comprising a copolymer of acrylonitrile and sodium methallylsulfonate and water for the adsorption of uremic toxins, wherein the water content of the membrane under ATPS conditions is in the range of from 70 to 75 wt.-%, relative to the total weight of the membrane, and wherein the clearance rate for IL-6 in HDF mode with $Q_B$=400 ml/min, $Q_D$=700 ml/min and UF=100 ml/min is in the range of from 20 to 40 ml/min, respectively.

Figure 9:
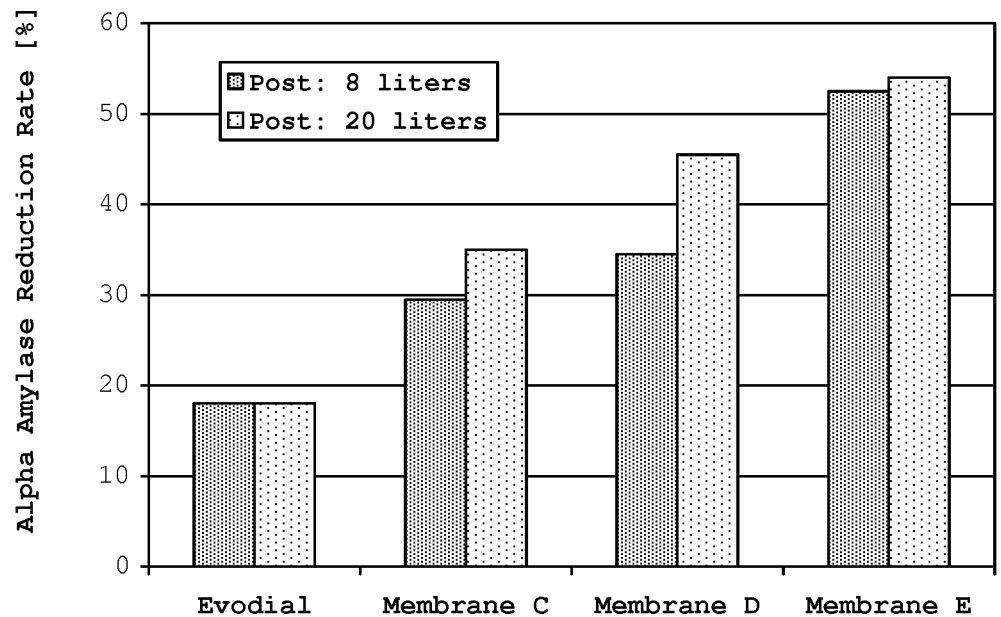
FIG. 9 shows the different removal rates of membranes C, D, and E according to the invention (see FIG. 2B, water content of more than 70 wt.-%) for alpha amylase (57 kDa) in comparison with the prior art membrane "Evodial" (water content 69 wt.-%) in post-dilution hemodiafiltration (HDF) mode for two different exchange volumes, 8 and 20 liters. The removal rates increase with increasing water content.
Figure 10:
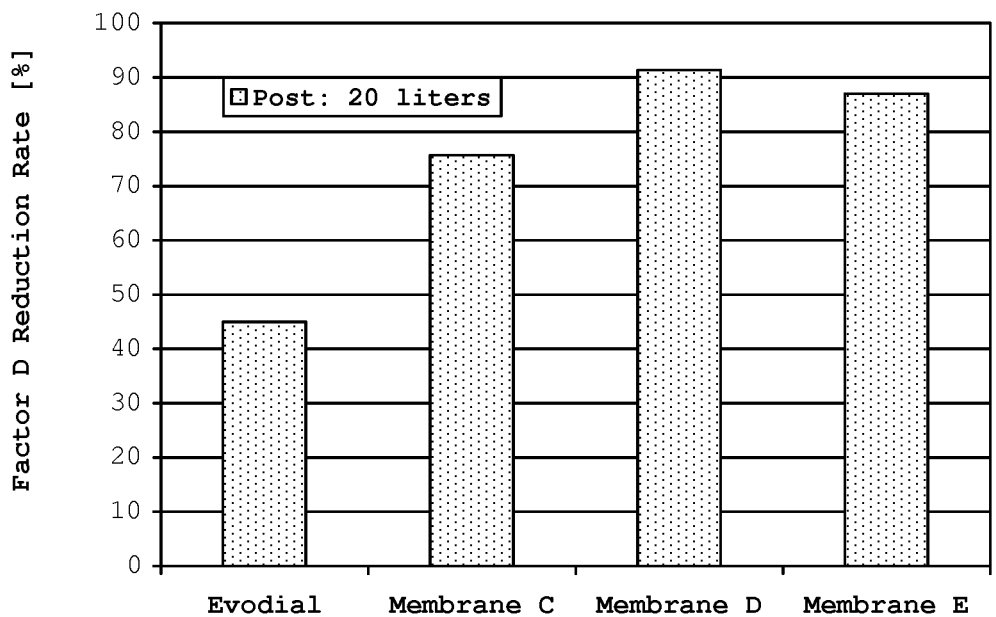
FIG. 10 shows the different removal rates of membranes C, D, and E according to the invention (see also FIG. 2B, water content of 70 wt.-% and more) for factor D (24 kD) in comparison with the prior art membrane "Evodial" (water content 69 wt.-%) in post-dilution hemodiafiltration (HDF) mode for an exchange volume of 20 liters. The removal rates, calculated at t=10 minutes, increase with increasing water content. It should be noted that the effect for this relatively small molecule (in comparison with alpha amylase of FIG. 9) reflects the increase in adsorption capacity rather than the change of convective capabilities (Lp) of the membrane.
Figure 11:
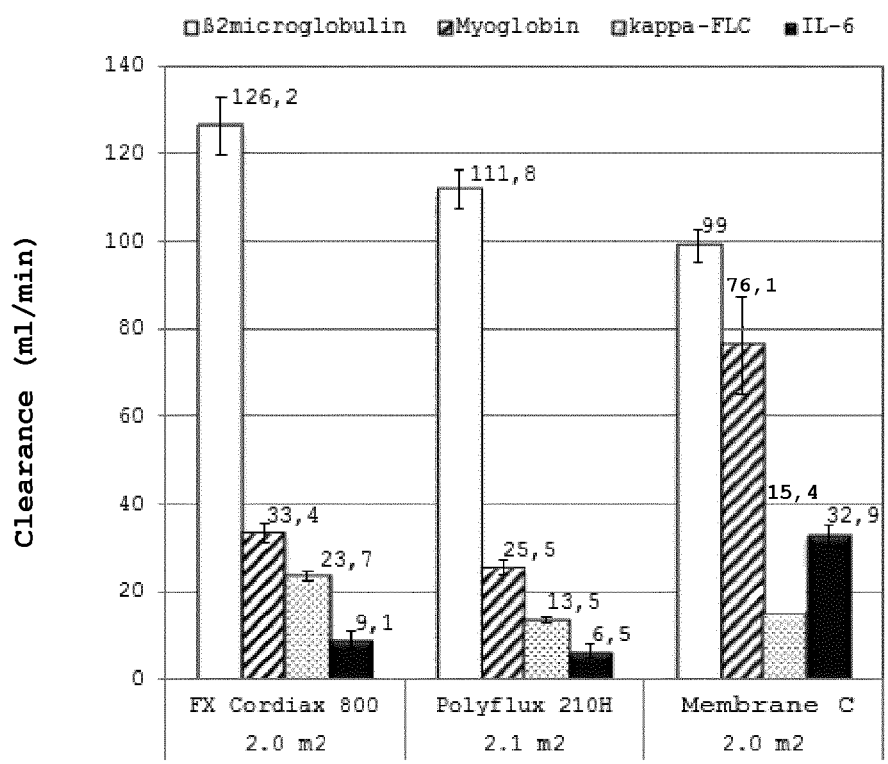
FIG. 11 depicts the respective plasma clearances (see Example 5) in high volume HDF mode ($Q_B$=400ml/min; $Q_D$=700ml/min; UF=100 ml/min) for beta2-microglobulin, myoglobin, kappa-FLC and IL-6 between a membrane according to the invention (Membrane C having a water content of about 70 wt.-%) and state of the art membranes which can be used in HDF.

First results of a clinical study (prospective, monocentric, open, non-randomized) have confirmed the in vitro data. The respective treatment modalities were HDF in post-dilution mode with exchange volumes of 8 or 20 liters. FIG. 9 shows a comparison of the reduction rates for alpha amylase (57 kDa) for the state of the art dialyzer Evodial, comprising a membrane with a water content of 69 wt.-%, and membranes according to the invention corresponding to data points and conditions (C), (D) and (E) as shown in FIG. 2B, respectively. The data have been retrieved in vivo, using HDF mode. Data points were determined at the end of the treatment sessions. In all cases post-dilution mode was applied (exchange volume 8 liters and 20 liters, respectively). The removal rates (in %) are significantly higher with dialyzers comprising membranes according to the invention. FIG. 10 depicts the in vivo (HDF) removal rate of Factor D (24 kDa) at QB=350 ml/min, QD=600 ml/min and a substitution volume of about 20L, which is in a range of between 75 to 100% of the molecules at session end, i.e. after about 4 hours of treatment. Again, a significantly higher removal rate can be determined for dialyzers comprising a membrane according to the invention compared to the prior art membrane. FIG. 11 gives an overview over the clearance rates for various marker molecules which were used to evaluate to effects of the higher water-content membrane C on the removal of certain molecules. It becomes evident that especially for higher molecular weight molecule the dialyzers comprising membranes according to the invention have a clear advantage over the prior art membrane.

The membranes according to the invention can efficiently be used to remove uremic toxins from a patients suffering from kidney damage. Due to their specific characteristics, they are capable of removing an extended range of molecules in terms of the molecular weight of the toxins, encompassing molecules which are generally referred to as middle molecules. The term "middle molecules", as it is used in the context of the present invention, refers to molecules having a molecular weight between 15 kDa and 60 kDa, specifically to molecules having a molecular weight between 15 kDa and 45 kDa, even though in the prior art this expression is sometimes used for a broader range of molecules.

The membrane based on the copolymer of acrylonitrile and at least one ionic or ionizable monomer may be a flat sheet membrane or a hollow fiber membrane. According to one aspect of the present invention, the membrane is a hollow fiber membrane which is composed of a homogeneous and symmetrical polyelectrolytic hydrogel derived from a copolymer of acrylonitrile and methallylsulfonate. Flat sheet membranes can also be prepared according to methods known in the art.

Figure 8:
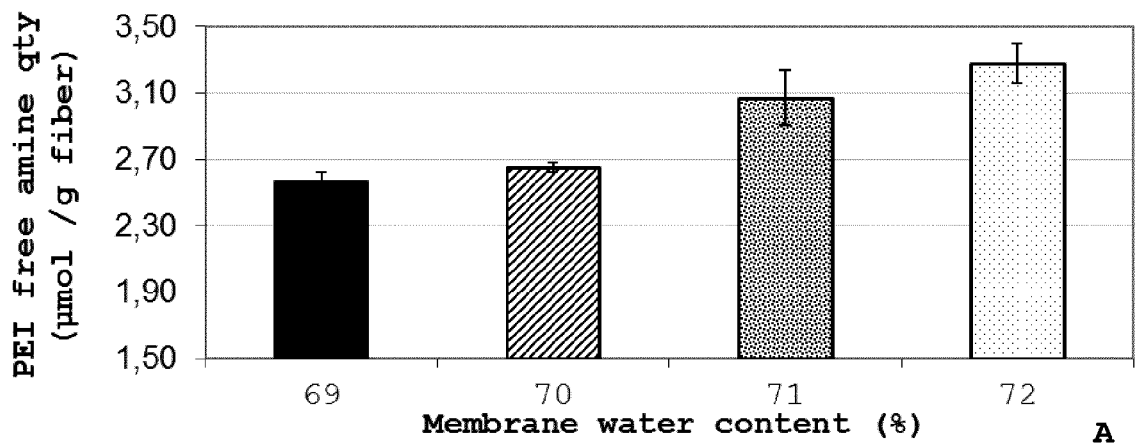
FIG. 8A reflects the different efficiency of membranes having a water content of 69 wt.-%, 70 wt.-%, 71 wt.-% and 72 wt.-%, respectively, in immobilizing PEI on their surface.
FIG. 8B shows the different capabilities of membranes having a water content of 69 wt.-%, 70 wt.-% and 71 wt.-%, respectively, regarding immobilizing heparin on their surface according to standard procedures (see, for example, WO 2007/148147 A1).
Figure 8:
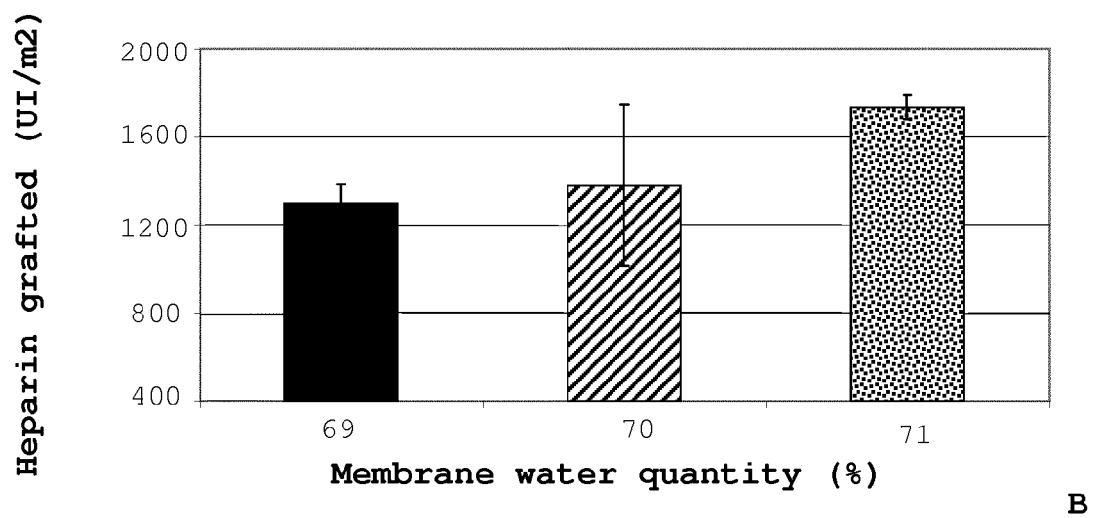

According to one embodiment of the invention, the surfaces of the membranes according to the invention are treated by ionic grafting of a polycationic polymer selected from the group consisting of polyamines, such as cationic polyaminoacids and/or polyimines, comprising polylysine, polyarginine, polyethylenimine (PEI) and copolymers and mixtures thereof. Membranes according to the invention which are characterized by a polycationic polymer grafted to their surface are a further object of the present invention. According to a specific embodiment of the present invention, said polycationic polymer is PEI. Such grafting can be done by methods known in the art and as described, for example, in U.S. Pat. No. 6,423,232 B1 and WO 2007/148147 A1. As shown in FIG. 8A, the membranes of the present invention are capable of immobilizing a higher amount of PEI per fiber (μmol/g fiber) due to their higher water content. The amount of PEI which can be accommodated on the fibers according to the invention is in a range of from 2.5 to 3.5 μmol PEI per g fiber.

It is a further object of the present invention to provide a membrane according to the invention which has an anticoagulant grafted onto its surface, wherein the anticoagulant agent is capable of forming an ionic bond with the cationic or cationizable groups of the polycationic polymer. The anticoagulation agent may comprise at least one compound of the glycoaminoglycanes family with anticoagulation activity, and is preferably selected from the group consisting of unfractionated heparin, fractionated heparin, danaparoids, heparin derivatives and mixtures of said products. The use of unfractionated heparin may prove to be especially beneficial. The surface concentration of the deposited anticoagulation agent usually should be in the range of from 1,000 to 30,000 IU/m², preferably in the range of from 1,500 to 10,000 IU/m². Methods of grafting heparin onto membranes based on a copolymer of acrylonitrile and sodium methallylsulfonate are also known in the art and are described, for example, in WO 2007/148147 A1. As shown in FIG. 8B, as a consequence of the higher amount of polycationic polymer (e.g., PEI) which can be grafted onto the fibers of the invention, the amount of heparin which can be grafted onto the fibers is increased, compared to the fibers known in the art having a water content of 69 wt.-%.

The hollow fibers according to the invention have an internal diameter of from approximately 180 to approximately 260 μm. According to one embodiment of the invention, inner diameter will be in the range of from 50 to 250 μm. The wall thickness will generally be in the range of from 35 to 60 μm, preferably in a range of from 40 to 50 μm.

As mentioned above, it is a further object of the present invention to provide a hollow fiber membrane useful for producing a device for the extracorporeal purification of blood. According to one aspect of the present invention, the hollow fiber is composed of a homogeneous and symmetrical polyelectrolytic hydrogel as described above. According to another aspect of the invention, the hollow fibers used each have an internal diameter of from 50 to 260 μm, in most cases of from 180 to 250 μm. The surface area of a dialyzer comprising hollow fiber membranes according to the invention may vary, but will usually be in a range of from 1.0 to 2.3 m². Dialyzers comprising the membrane of the invention can be assembled as known in the art. Sterilization of the devices will normally be done by irradiation with gamma rays or using ETO.

Devices according to the invention can be used on known dialysis machines, such as the Prismaflex systems provided by Gambro, with blood flow rates of between 150 ml/min and 500 ml/min. Average blood flow rates will be in the range of between 200 and 500 ml/min. The devices comprising membranes according to the invention can be used in hemodialysis as well as in hemodiafiltration mode, including pre- and post-dilution.

Membranes according to the invention, which are specifically suitable for HDF mode treatments have a water content, under ATPS conditions, of about 70 wt.-% to about 71 wt.-% and are represented, for example, by data point (C) in FIG. 2B, whereas membranes with an even higher water content of from about 70 wt.-% to about 73 wt.-% are especially suitable for hemodialysis mode, wherein the range of molecules which will be removed by hemodialysis can be extended to higher molecular weights. Membranes having a water content, under ATPS conditions, of from about 73 wt.-% to about 75 wt.-% are especially suitable for acute therapies which would be addressed by so-called high cut-off (HCO) membranes which will accept a certain albumin loss in exchange for the improved removal of relatively large molecules up to the molecular weight of albumin. In this case albumin replacement may be necessary for the safe, prolonged use of such high cut-off type membranes.

The expression "HDF" as used herein refers to hemodiafiltration. While hemodialysis (HD) is primarily based on diffusion, thus relying on differences in concentration as the driving force for removing unwanted substances from blood, hemodiafiltration (HDF) also makes use of convective forces in addition to the diffusive driving force used in HD. Said convection is accomplished by creating a positive pressure gradient across the dialyzer membrane. Accordingly, blood is pumped through the blood compartment of the dialyzer at a high rate of ultrafiltration, so there is a high rate of movement of plasma water from blood to dialysate which must be replaced by substitution fluid that is infused directly into the blood line. Dialysis solution is also run through the dialysate compartment of the dialyzer. Hemodiafiltration is used because it may result in good removal of both large and small molecular weight solutes. The substitution fluid may be prepared on-line from dialysis solution wherein the dialysis solution is purified by passage through a set of membranes before infusing it directly into the blood line.

The membranes of the inventions and dialyzers comprising said membranes, apart from being useful in hemodialysis or hemodiafiltration treatment as mentioned before, may be used for the treatment of chronic kidney disease patients who will benefit from the extended range of molecules which can be removed by the membrane. Due to the aforementioned adsorption capacities which allow the removal of an extended range of molecules, comprising molecules of up to about kDa, combined with significantly improved convective properties, the membranes and hemodialyzers of the invention can be especially beneficially used in CRRT. Continuous renal replacement therapy (CRRT) is any extracorporeal blood purification therapy designed to substitute for impaired renal function over an extended period, and intended to be applied for up to 24 hours a day. CRRT is a modality specifically designed for treating ICU patients with acute kidney injury (AKI), especially in the case of hemodynamically unstable AKI patients. The membranes and dialyzers of the invention can also be used in cascade filtration systems.

It will be readily apparent to one skilled in the art that various substitutions and modifications may be made to the invention disclosed herein without departing from the scope and spirit of the invention.

EXAMPLES

Example 1

Preparation of Hollow Fibers and Determination of Liquid Permeability

Hollow fibers as shown herein were obtained using a gelification process that consists of processing a collodion composed of acrylonitrile and sodium methallylsulfonate (91:9) (35 wt.-o), DMF (52 wt.-%) and glycerol (13 wt.-o), and as further described in FIG. 1. The spinning nozzle temperature was adjusted to 140° C. The center medium was nitrogen (inert gas). The default spinning bath temperature was set to 10° C. The distance of the spinneret to the spinning bath was set to 1 m. Stretching was performed at about 95° C. Differences to this process were introduced with regard to the stretching conditions (stretching ratios) as shown, for example, in FIGS. 2A, 2B and 3B or with regard to the spinning bath temperature (see FIGS. 3A and 3B) or both.

Example 2

Determination of Hydraulic Permeability, Lp

Mini-modules of samples of 40 fibers of a given membrane (see Example 1) were used to measure the respective membrane's hydraulic permeability with pure water. The mini-modules had a length of 50 cm. The 40 fibers were isolated from each other by using polyurethane glue at one ending. The fibers were re-opened at the potted end by cutting the bundle at its extremity. The effective membrane surface area (A) of the fibers amounted to 130 cm². The non-potted extremity was clamped during the experiment.

The liquid permeability Lp was determined at 37° C. by measuring the time (Δt) after which a defined water volume (ΔV) has completely passed through the membrane surface (A) under a known transmembrane pressure (P) following Equation (1):

$$Lp = \frac{\Delta V/\Delta t}{PA} \quad (1)$$

Based on the pressure applied, the pressure in the blood compartment of the fiber is larger than that on the dialysate side of the fiber. This results in a displacement of a certain volume of water (ultrafiltrate), measured by the increase of water volume on the dialysate side of the fiber bundle. The Lp of a membrane is given as ml/h·mmHg·m². The pressure applied in the Examples (see also the respective Figures) was 500 mbar.

Example 3

Determination of Water Content

A fiber sample of a given mass (M0) between 9,0 and 11,0 g is continuously heated during 4 h under reflux with 400 ml of methanol using a Kumagawa extractor. The fiber sample is then heated at 105±3° c. for 2 h. After cooling in a desiccator for 30 min, the sample is weighted (M1). The polymer mass is then expressed in % with P % (w/w)=100 M1/M0. The fiber water content is expressed in % with W % (w/w)=100−P %.

Example 4

Determination of Removal Rates for Alpha Amylase and Factor D

Blood samples at the beginning and end of a dialysis session were collected in tubes containing EDTA as an anticoagulant and centrifuged for plasma collection. The concentration of Factor D was assayed using an enzyme-linked immunosorbent assay (ELISA) utilizing matched antibody pairs.

The concentration of alpha amylase was assayed by enzymatic photometry.

Solute reduction rate is expressed as RR (%)=(Ct0−Ct4cor)×100/Ct0, wherein
Ct0 is the solute concentration at the beginning of a dialysis session, and
Ct4cor is the solute concentration Ct4 at the end of a 4 hour dialysis session, corrected using the Bergström formula to take into account the hemoconcentration: Ct4cor=Ct4/(1+UF/(0,2×initial weight).

Example 5

Determination of Plasma Clearances

Middle molecule clearances of membrane C, FX cordiax 800 (Fresenius), and Polyflux 210 H (Gambro) were compared in HDF treatment with 400 ml/min blood flow and 700ml/min dialysate flow and ultrafiltration rate of 100 ml/min (corresponding to a substitution volume of 6 L/h).

In each experiment (n=3), 1 L of uniform human plasma (protein concentration 60 g/L) was recirculated for 60 min, followed by a 60 min simulated treatment. Markers were spiked into the plasma pool after 55 min of recirculation: human B2-microglobulin (5 mg), human myoglobin (500 µg) and K-FLC (~300 mg); while interleukin 6 is comprised in the human plasma.

Samples were taken from the pool and the dialysate after defined time intervals. The concentrations of markers were measured by nephelometry and the clearances were calculated from the first order kinetics for the variation of the pool concentration over time.

The invention claimed is:

1. A membrane comprising i) a copolymer of acrylonitrile and sodium methallylsulfonate and ii) water, characterized in that the water content of the membrane under ATPS conditions is in the range of from about 70 wt.-% to about 75 wt.-%, relative to the total weight of the membrane, and
wherein the membrane is prepared according to steps comprising:
(a) forming a polymer composition comprising i) acrylonitrile and sodium methallylsulfonate in a molar ratio of between 90:10 and 99:1, ii) a solvent selected from the group consisting of DMF, DMSO and NMP; and iii) glycerol;
(b) heating the composition formed in step (a);
(c) passing the composition of step (b) through a spinning nozzle comprising i) two concentric rings which enclose the polymer composition and ii) a center opening which is perfused with an inert gas to make a preformed hollow fiber;
(d) passing the preformed hollow fiber of step (c) into a spinning bath, wherein the spinning bath has a temperature in the range of from about 25° C. to about 50° C.; and
(e) thereafter subjecting the hollow fiber of step (d) to an operation of stretching at a stretching ratio in a range from about 3.6 to about 4.5.

2. A membrane according to claim 1, characterized in that the water content of the membrane is in the range of from about 70 wt.-% to about 73 wt.-%.

3. A membrane according to claim 1, characterized in that the Lp of the membrane is in the range of from about 70 ml/h·mmHg·m² to about 125 ml/h·mmHg·m².

4. A membrane according to claim 1, characterized in that the in vivo removal rate for Factor D after about 4 hours of treatment in HDF with a substitution volume of about 20 L with $Q_B$=350 ml/min, $Q_D$=600 ml/min and UF=100 ml/min with an effective membrane surface area of from about 1.0 m² to about 2.2 m² is from about 75% to about 100%.

5. A membrane according to claim 1, characterized in that the amount of polyethylenimine (PEI) which can be accommodated on the membrane is in a range of from about 2.5 µmol PEI to about 3.5 µmol PEI per g fiber.

6. A membrane according to claim 1 further comprising an anticoagulation agent immobilized on the membrane, characterized in that the surface concentration of the anticoagulation agent is in the range of from about 1,000 IU/m² to about 10,000 IU/m².

7. A method for preparing a hollow fiber membrane according to claim 1, comprising the steps of
(a) forming a polymer composition consisting of
i) about 34 wt.-% to about 36 wt.-% of acrylonitrile and sodium methallylsulfonate in a molar ratio of between 90:10 and 99:1;
ii) about 50 wt.-% to about 58 wt.-% of a solvent selected from the group of solvents consisting of DMF, DMSO and NMP; and
iii) about 6 wt.-% to about 16 wt.-% of glycerol, wherein all components add up to 100% in the final polymer composition;

(b) heating the composition of (a) to a temperature in the range of from about 110° C. to about 150° C.;

(c) passing the composition through a spinning nozzle comprising two concentric rings which enclose the polymer composition, and a center opening which is perfused with an inert gas;

(d) after passage of an air gap of from about 0.8 m to about 1.9 m passing the preformed hollow fiber of (c) into a spinning bath;

characterized in that the temperature of the spinning bath of step (d) is in the range of from about 30° C. to about 45° C.

8. The method of claim 7, characterized in that the hollow fibers are subjected to an operation of stretching by two to five times at a temperature of between about 90° C. and about 100° C.

9. The method of claim 8, characterized in that the stretching ratio is in the range of from about 3.6 to about 4.5.

10. The method of claim 7, characterized in that the spinning bath temperature is in the range of from about 40° C. to about 45° C.

11. A hemodialyzer for the purification of blood comprising a bundle of hollow fiber membranes according to claim 1.

12. A hemodialyzer according to claim 11, characterized in that the clearance rate for myoglobin determined in vitro according to IS08637: 2004 (E) at a $Q_B$ in the range of from about 300 ml/min to about 500 ml/min and a $Q_D$ of about 700 ml/min; an ultrafiltration rate of between 0 ml/min and 20 ml/min; and with an effective surface area of from about 1.0 m² to about 2.2 m² is between about 60 ml/min and about 90 ml/min.

13. A hemodialyzer for the purification of blood as produced by the process according to claim 7.

14. A hemodialyzer according to claim 13, characterized in that the clearance rate for myoglobin determined in vitro according to IS08637: 2004 (E) at a $Q_B$ in the range of from about 300 ml/min to about 500 ml/min and a $Q_D$ of about 700 ml/min; an ultrafiltration rate of between 0 ml/min and 20 ml/min; and with an effective surface area of from about 1.0 m² to about 2.2 m² is between about 60 ml/min and about 90 ml/min.

15. A method of treating chronic kidney disease in a patient, said method comprising the step of using a membrane according to claim 1 on the patient.

16. A method of treating acute renal failure in a patient, said method comprising the step of using a membrane according to claim 1 on the patient.

17. A membrane according to claim 1, wherein the polymer composition of step (a) comprises about 34 wt.-% to about 36 wt.-% of acrylonitrile and sodium methallylsulfonate in a molar ratio of between 90:10 and 99:1.

18. A membrane according to claim 1, wherein the polymer composition of step (a) comprises about 50 wt.-% to about 58 wt.-% of a solvent selected from the group consisting of DMF, DMSO and NMP.

19. A membrane according to claim 1, wherein the polymer composition of step (a) comprises about 6 wt.-% to about 16 wt.-% of glycerol.

20. A membrane according to claim 1, wherein the heating of step (b) is performed at a temperature range of from about 110° C. to about 150° C.

21. A membrane according to claim 1, wherein step (d) is performed after passage of an air gap of from about 0.8 m to about 1.9 m.

22. A membrane according to claim 1, wherein the temperature of the spinning bath of step (d) is in the range of from about 30° C. to about 45° C.

23. A membrane according to claim 1, wherein the operation of stretching of step (e) stretches the hollow fiber by two to five times its initial length.

24. A membrane according to claim 1, wherein the stretching of step (e) is performed at a temperature of between about 90° C. and about 100° C.

25. A membrane according to claim 1, wherein the stretching of step (e) is performed at a ratio in the range of from about 3.6 to about 4.1.

26. A membrane according to claim 1, wherein the temperature of the spinning bath of step (d) is in the range of from about 40° C. to about 45° C.

* * * * *